UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

COMPOSITE TITANIC-OXID PRODUCT AND METHOD OF PRODUCING THE SAME.

1,288,473.  Specification of Letters Patent.  Patented Dec. 24, 1918.

No Drawing.  Application filed August 11, 1917. Serial No. 185,675.

*To all whom it may concern:*

Be it known that I, LOUIS E. BARTON, a citizen of the United States, and a resident of Niagara Falls, in the county of Niagara and State of New York, have invented a certain new and useful Composite Titanic-Oxid Product and Method of Producing the Same, of which the following is a specification.

My present invention relates particularly to so-called "composite titanic oxid pigments", containing important amounts of titanic oxid ($TiO_2$), in the form of minute particles adherent to, or coalesced with, carrier particles such as composed of sulfates precipitated in a titanic sulfate solution as, for example per Letters Patent No. 1,155,462, dated October 5, 1915, or No. 1,205,144, dated November 21, 1916; or such as composed of "extender pigment" substances mechanically added to a titanic solution, as per my pending application for Letters Patent Serial No. 102,392, filed June 8, 1916.

The objects of my present invention comprise the production of analogous composite titanic oxid products, which, without substantially greater titanic content, are of as great, or even greater, hiding, or covering power than former such products when employed as pigments, or "fillers," and are more readily, and at less cost, producible on industrial scales, and also more desirable in that their content of carrier particles is more readily and effectively variable, or adjustable, as regards the mechanically added percentages of the said "extender pigment" particles.

The invention is based on my discovery that carrier particles such as sulfates precipitated in the solution, exercise during their nascent state an adsorption action, not only as regards the titanic particles, but also as regards particles of the mechanically added extender pigment particles, the result being that in such case the latter are, as it were, caused to act as carriers for the binary composite pigment formed by mutual coalescence, in the solution, of the therein precipitated sulfate and titanic particles.

I find that by aid of my present invention the final composite products containing extender pigment carrier particles mechanically added to the solution possess, instead of about the same hiding power as that of mere mechanical mixtures of titanic oxid with extender pigments, an importantly greater hiding power, although their content of titanic oxid be no greater, and this I am inclined to attribute to the effect of the presence in the solution of the freshly precipitated, or nascent, sulfate bases during precipitation of the titanic particles.

It will also be noted that my present method advantageously obviates the hitherto step of withdrawing from the solution in whole or in part the precipitated sulfates in those cases in which carriers other than those are, for special purposes, desired, and it thus enables the operator to regulate as required, and without impairment of hiding power, the kinds and respective percentages of the carrier substances in the final product.

My present invention is practised and its novel composite product thereby attained as follows, viz:

For example, I produce, in any well known manner, a titanic sulfate solution, preferably as free as possible from impurities, or undesired substances; as, for instance, by resort to procedures described in said Letters Patent Nos. 1,155,462, or 1,205,144, etc. I add to the solution a quantity of the "extender pigment", or pigments, such as barytes, silica, china clay, asbestine, etc., sufficient to, in addition to the sulfate bases to be precipitated, make up the total of base materials desired in the product.

I also add to the solution such reagents as are requisite to insure precipitation therein of the said sulfate base particles. But, at this stage, instead of, as heretofore, proportioning and adding such reagents, for example, calcium chlorid and sulfuric acid in quantity such as to insure precipitation of the utmost possible of the sulfates present, I add, by my present method, only so much of the particular reagents required as to so precipitate but a predetermined quantity of such bases.

The charge is then, as usual, as for example, per the procedures of said patents, heated, or otherwise treated, so as to cause precipitation therein of its titanic compounds which I believe then coalesce with, and adhere to, the precipitating, or freshly precipitated, sulfate particles, and the resulting binary composite precipitates in turn coalesce with and adhere to the mechanically added "extender pigment" particles. The resulting triply composite precipitate products are then, as usual, withdrawn from the charge and dried, or also calcined, to produce the novel ternary composite titanic oxid pigment products of my present invention.

Having now described my invention, what I claim as new and desire to secure by Letters Patent is the following, viz:

1. The ternary composite titanic oxid pigment comprising carrier particles composed of mutually coalesced and to each other adherent particles of a sulfate base and of an extender pigment, the said carrier particles having also therewith coalesced and thereto adherent particles of titanic oxid.

2. The ternary composite titanic oxid product comprising carrier particles composed of mutually coalesced and to each other adherent particles of a sulfate base and of an extender pigment, the said carrier particles having also therewith coalesced and thereto adherent titanic particles.

3. The method of producing a ternary composite titanic oxid pigment which comprises the precipitation of a base in a titanic solution containing a thereto mechanically added extender pigment, and the treatment of the charge so as to therein precipitate a titanic compound.

4. The method of producing a ternary composite titanic oxid pigment which comprises the precipitation of a base in a titanic solution containing a thereto mechanically added extender pigment, the treatment of the charge so as to therein precipitate a titanic compound, and the withdrawal of the resulting ternary composite precipitate product and the calcining of it.

5. The method of producing from a titanic sulfate solution a ternary composite titanic oxid pigment which comprises adding to said solution particles of an extender pigment in quantity calculated to impart to said ternary pigment a desired content thereof, adding to said solution a reagent qualified to precipitate therein particles of a sulfate base, said reagent being in quantity calculated to so precipitate and thus impart to said ternary pigment a desired content of said base, treating the charge so as to therein precipitate a titanic compound, withdrawing from the charge the resulting mutually coalesced precipitates and solids, and calcining them.

LOUIS E. BARTON.

Witnesses:
ROBERT R. EASTON,
EURETH GOOLD.